United States Patent
Mizuta

(10) Patent No.: US 11,436,816 B2
(45) Date of Patent: Sep. 6, 2022

(54) INFORMATION PROCESSING DEVICE, LEARNING DEVICE, AND STORAGE MEDIUM STORING LEARNT MODEL

(71) Applicant: SEIKO EPSON CORPORATION, Tokyo (JP)

(72) Inventor: Kiyoshi Mizuta, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 297 days.

(21) Appl. No.: 16/809,070

(22) Filed: Mar. 4, 2020

(65) Prior Publication Data

US 2020/0285881 A1    Sep. 10, 2020

(30) Foreign Application Priority Data

Mar. 7, 2019 (JP) .............................. JP2019-041145

(51) Int. Cl.
| | | |
|---|---|---|
| *G06N 20/00* | (2019.01) | |
| *G06V 10/26* | (2022.01) | |
| *G06N 3/08* | (2006.01) | |
| *G06V 20/62* | (2022.01) | |
| *G06V 30/148* | (2022.01) | |
| *G06V 30/10* | (2022.01) | |

(52) U.S. Cl.
CPC .......... *G06V 10/267* (2022.01); *G06N 3/084* (2013.01); *G06N 20/00* (2019.01); *G06V 20/63* (2022.01); *G06V 30/153* (2022.01); *G06V 30/10* (2022.01)

(58) Field of Classification Search
CPC ...... G06V 10/267; G06V 10/82; G06V 20/63; G06V 20/62; G06V 30/153; G06V 30/10; G06V 30/148; G06V 30/40; G06N 3/084; G06N 3/0454; G06N 20/00; G06K 9/6273

See application file for complete search history.

(56) References Cited

U.S. PATENT DOCUMENTS

2016/0125237 A1\* 5/2016 Ghatage ............... G06V 10/235
    382/182
2018/0349693 A1\* 12/2018 Watanabe ............ G06V 30/418

FOREIGN PATENT DOCUMENTS

| CN | 102054171 A | * | 5/2011 | ......... G06K 9/00449 |
|---|---|---|---|---|
| CN | 107180264 A | * | 9/2017 | .......... G06F 16/353 |
| CN | 109344838 A | * | 2/2019 | ............. G06K 9/344 |
| JP | H04-105186 | | 4/1992 | |
| JP | 2017-174309 | | 9/2017 | |
| JP | 2018-005462 | | 1/2018 | |
| JP | 6465427 | | 2/2019 | |

\* cited by examiner

*Primary Examiner* — Matthew C Bella
*Assistant Examiner* — Kathleen M Broughton
(74) *Attorney, Agent, or Firm* — Workman Nydegger

(57) ABSTRACT

The information processing device includes a storage section storing a learnt model, a reception section, and a processor. The learnt model is obtained by mechanically learning the relationship between a sectional image obtained by dividing a voucher image and a type of a character string included in the sectional image based on a data set in which the sectional image is associated with type information indicating the type. The reception section receives an input of the voucher image to be subjected to a recognition process. The processing section generates a sectional image by dividing the voucher image received as an input and determines a type of the generated sectional image based on the learnt model.

11 Claims, 15 Drawing Sheets

FIG. 1

STORE DEALING WITH CONTAINER
DEDICATED FOR LIGHT OIL (COMPLY WITH
FIRE SERVICE ACT)

RECEIPT

FUELING BY CASH (4)
(SAT.) 10/22/2016 13:10

XXX TARO  4-31  64-41

4-150500-00431-5000      678567 0     — A2

56,91L      @127,00      ¥ 7,228

TOTAL              ¥ 7,228
(INCLUDING CONSUMPTION TAX ¥ 535)

PAID            ¥ 10,000
CHANGE          ¥ 2,772

YYY Co., Ltd   ZZ GS
TEL 555-555-5555           — A1

10/22/2016              No:01349
SC:150808-1
              CHANGE No.: 3262

FIG. 11

| | |
|---|---|
| E1 → | TEL: 555-555-5555 |
| E2 → | TELEPHONE 666-666-6666 |
| E3 → | EE STORE    7777-77-7777 |
| E4 → | TEL: 9999-99-9999   SS: 2360900500 |

FIG. 12

| |
|---|
| DATE AND TIME OF SELL: 10/14/2016  9:36 |
| (SAT.) 10/29/2016 19:54   000303 |
| (TUE.) 09-13-2016 09:29:48 |
| 3/2/2017  12:33 |

FIG. 13

| | | |
|---|---|---|
| TOTAL | | ¥8,200 |
| TOTAL | | ¥5,000 |
| TOTAL | 19 | ¥10,620 |
| TOTAL AMOUNT | | ¥7,280 |

FIG. 17

TEL: 555-555-5555
TELEPHONE 666-666-6666
7777-77-7777
9999-99-9999

TOTAL    ¥8,200
TOTAL    ¥5,000
TOTAL    19    ¥10,620
TOTAL AMOUNT    ¥7,280

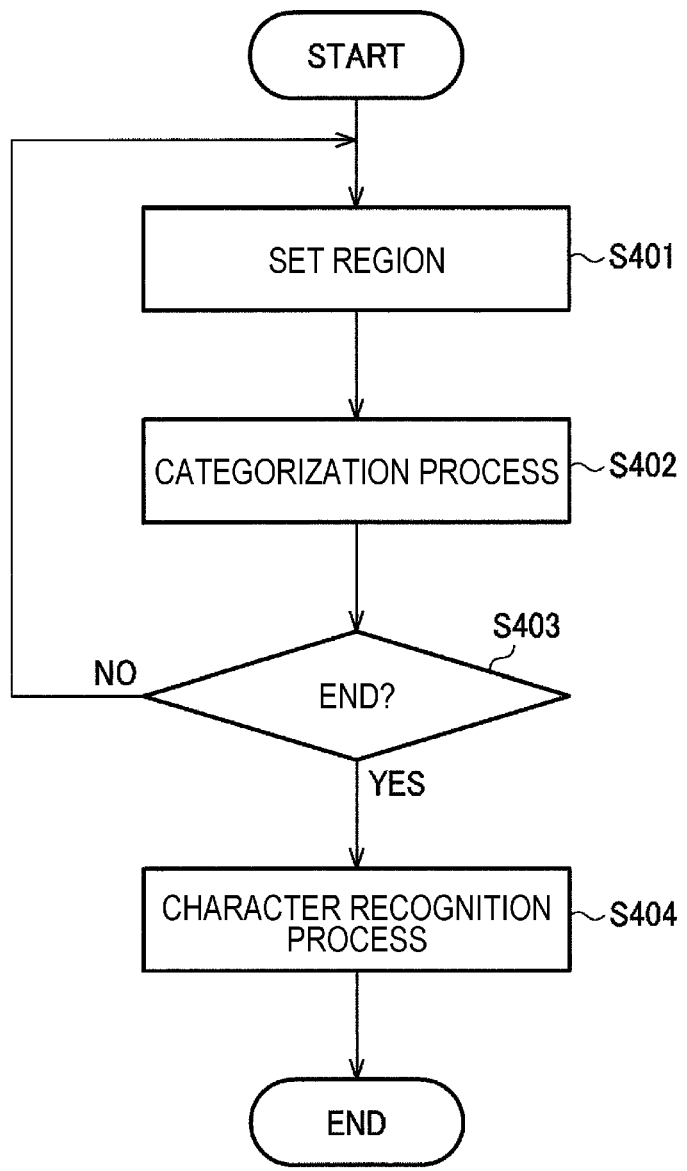

INFORMATION PROCESSING DEVICE, LEARNING DEVICE, AND STORAGE MEDIUM STORING LEARNT MODEL

The present application is based on, and claims priority from JP Application Ser. No. 2019-041145, filed Mar. 7, 2019, the disclosure of which is hereby incorporated by reference herein in its entirety.

BACKGROUND

1. Technical Field

The present disclosure relates to an information processing device, a learning device, and a storage medium storing a learnt model.

2. Related Art

In general, a method for performing a character recognition process on a voucher image, such as a receipt, has been used. JP-A-2017-174309 discloses a method for recognizing a telephone number character string, a product name character string, and a price character string by means of optical character recognition (OCR), for example.

In the character recognition process performed on a voucher image, false recognition may occur. When an item, such as a telephone number, is extracted from text data obtained by OCR performed on a voucher image, for example, a character string which is different from a telephone number may be falsely recognized as a telephone number. In other words, when a portion of the text data is categorized into a certain item, the categorization may be inappropriately performed. Therefore, it is difficult to accurately extract an important item, such as a telephone number, from a voucher image.

SUMMARY

According to an aspect of the present disclosure, an information processing device includes a storage section configured to store a learnt model obtained by mechanically learning the relationship between a sectional image obtained by dividing a voucher image and a type of a character string included in the sectional image based on a data set in which the sectional image and type information indicating the type are associated with each other, a reception section configured to receive an input of the voucher image to be subjected to a recognition process, and a processor configured to generate the sectional image by dividing the voucher image received as an input and perform an estimation process of determining the type of the generated sectional image based on the learnt model.

BRIEF DESCRIPTION OF THE DRAWINGS

FIG. 1 is a diagram illustrating an example of a false recognition of a telephone number in a voucher image.

FIG. 11 is a diagram illustrating examples of line images corresponding to telephone numbers.

FIG. 12 is a diagram illustrating examples of line images corresponding to dates.

FIG. 13 is a diagram illustrating examples of line images corresponding to total amounts.

FIG. 17 is a diagram illustrating examples of region images corresponding to telephone numbers.

FIG. 18 is a diagram illustrating examples of region images corresponding to dates.

FIG. 19 is a diagram illustrating examples of region images corresponding to total amounts.

FIG. 20 is a flowchart of a process performed by an information processing device.

DESCRIPTION OF EXEMPLARY EMBODIMENTS

Embodiments will be described hereinafter. Note that the embodiments described herein do not unduly limit content described in claims. Furthermore, it is not necessarily the case that all components described in the embodiments are requirements.

1. Outline

In general, a method for automatically reading a specific item in a voucher image has been used. The term "voucher" means a document which proves that accounting transaction has been actually performed, such as a receipt and an invoice. The term "voucher image" indicates image data obtained when a voucher is read by a scanner. Although a receipt is taken as an example hereinafter, methods of the embodiments may be applied to other vouchers in an extension manner.

Important items of accounting may be a transaction counterparty, a transaction date, and a transaction amount. A database in which a name, an address, and a telephone number of a transaction counterparty are associated with one another is used for accounting. Therefore, the telephone number included in a voucher image is useful as information for specifying a transaction counterparty. The date is information for specifying a month, a day, and a year in detail. The transaction amount is a total amount in a transaction to be processed in the narrow sense.

The voucher includes various information in addition to the telephone number, the date, and the total amount. A burden of a user is large when the user manually extract a telephone number or the like, and therefore, a process using a pattern matching dictionary is efficiently used. The process using a pattern matching dictionary is specifically the OCR.

For example, in a general method, a character recognition is performed on the voucher image in a unit of character using the pattern matching dictionary in a unit of character. Then a target character is detected in a result of the character recognition so that a type of a line in the voucher image is specified. For example, in the general method, to specify positions of the telephone numbers, a character string having a format of a telephone number is retrieved from recognition results of the OCR. To specify positions of dates, characters in a format of "month/day/year" are retrieved from the recognition result of the OCR. To specify positions of a total amount, a character string "yen", a symbol "Y", and the like are retrieved from the recognition result of the OCR.

Figure 2:
FIG. 2 is a diagram illustrating an example of a false recognition of a date in a voucher image.
Figure 3:
FIG. 3 is a diagram illustrating an example of a false recognition of a total amount in a voucher image.

FIGS. 1 to 3 are diagrams illustrating examples of false recognitions according to the general method. In a voucher image of FIG. 1, a telephone number of a transaction counterparty is described in a region indicated by A1. However, when a character string including a plurality of numbers and a hyphen which are continuously arranged is retrieved as a character string having a format of a telephone number, a region indicated by A2 may be recognized as a telephone number. In a voucher image of FIG. 2, a date of a transaction is described in a region indicated by B1. However, when a format "month/day/year" is set as a retrieval target, a date indicating an expiration date of points may be falsely recognized as a date of a transaction as denoted by B2. In a voucher image of FIG. 3, a total amount is described in a region indicated by C1. However, various amounts including prices of individual products, a subtotal without tax, and consumption tax are included in the voucher image. Therefore, when a character "Y" or the like is determined as a retrieval target, an amount of money which is different from a total amount may be falsely recognized as a total amount as indicated by C2.

Accordingly, in this embodiment, the relationships between sectional images obtained by dividing the voucher image and types of character strings included in the sectional images are mechanically learnt. Each of the sectional images corresponds to a partial region of the voucher image and may be sectioned for each line or another unit as described below in first and second embodiments. By this, a type of a character string included in the voucher may be accurately identified. Accordingly, false recognition of a position of a desired type of character string may be suppressed. Hereinafter, a type of character string included in a sectional image is also referred to as a type of sectional image.

2. First Embodiment

A first embodiment will now be described. A sectional image in the first embodiment is obtained by dividing a voucher image in a unit of line.

2.1 System Configuration

Figure 4:
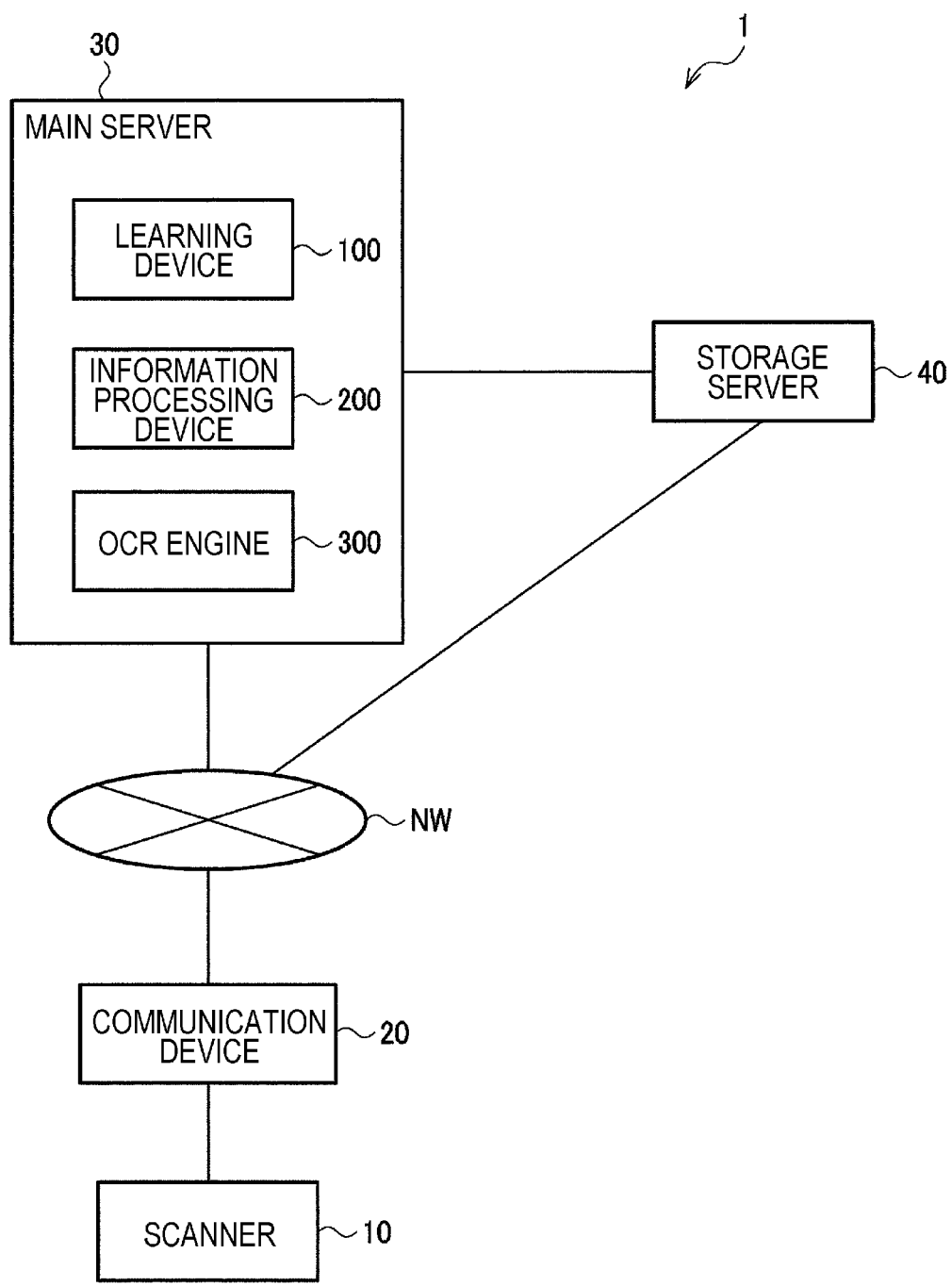
FIG. 4 is a diagram illustrating an example of a system configuration.

FIG. 4 is a diagram illustrating an example of a configuration of a system according to the first embodiment. As illustrated in FIG. 4, a system 1 includes a scanner 10, a communication device 20, a main server 30, and a storage server 40. The main server 30 and the storage server 40 may offer cloud services for a user through a public communication network, such as the Internet.

The scanner 10 optically reads a document, generates image data in accordance with a predetermined format as a result of the reading, and outputs the generated image data to an outside. The scanner 10 may be a multifunction peripheral having a plurality of functions including a print function and a facsimile communication function in addition to a scanner function. The scanner 10 may be communicated with the communication device 20 in a wired or wireless manner so as to transmit the image data to the communication device 20.

The communication device 20 is a personal computer (PC), a smartphone, a tablet terminal, a cellular phone, or a processing device having processing capability which is the same as those of the smartphone, the tablet terminal, the cellular phone, and the processing device. The communication device 20 is connected to a network NW through a communication interface, not illustrated. Examples of the network NW include a local area network (LAN), an Internet communication network, and other public lines. Note that the scanner 10 and the communication device 20 may be independent from each other as illustrated in FIG. 4 or may be included in a single device. Specifically, the scanner 10 may be a multifunction peripheral having a function of communicating with external devices through the network NW when including the communication device 20.

The main server 30 is realized by at least one processing device functioning as a server in the network NW. The main server 30 includes a learning device 100 which performs a learning process, an information processing device 200 which performs an estimation process, and an OCR engine 300. The main server 30 includes at least one integrated circuit (IC) having a central processing unit (CPU), a read only memory (ROM), and a random access memory (RAM) and other memories. Furthermore, the main server 30 includes at least one interface which executes external communication in a wired or wireless manner based on a predetermined communication protocol including general communication standards.

The main server 30 is coupled to the storage server 40 in the example of FIG. 4. The storage server 40 is also realized by at least one processing device functioning as a server in the network NW. The storage server 40 obtains data from the main server 30 and stores the data. Note that the main server 30 and the storage server 40 may be independent from each other or may not be independent from each other. For example, a common server may function as the main server 30 and the storage server 40. The storage server 40 stores the voucher image transmitted from the communication device 20.

The learning device 100 performs a learning process based on the voucher image stored in the storage server 40 and outputs a result of the learning. The learning result is specifically a learnt model. The information processing device 200 performs a process of determining a type of a sectional image based on the learnt model generated by the learning device 100. Specifically, the information processing device 200 receives the voucher image to be processed from the communication device 20, extracts a telephone number, a date, and a total amount from the voucher image by performing a process on the voucher image based on the learnt model, and outputs a result of the extraction. The extraction result is stored in the storage server 40, for example. Note that, as described below, a character recognition process using the OCR is performed similarly to the general methods in the processes performed by the learning device 100 and the information processing device 200. The OCR engine 300 performs the character recognition process.

The storage server 40 performs a process of returning the extraction result in response to a request for obtaining the extraction result. For example, a terminal device used by an accounting department of a company having the scanner 10 and the communication device 20 or an accounting office or the like working for the company transmits the obtainment request described above. In this way, a load of an accounting process performed by an accountant profession may be reduced since a process of extracting important items from a voucher may not be manually performed.

2.2 Learning Process

2.2.1 Configuration of Learning Device

Figure 5:
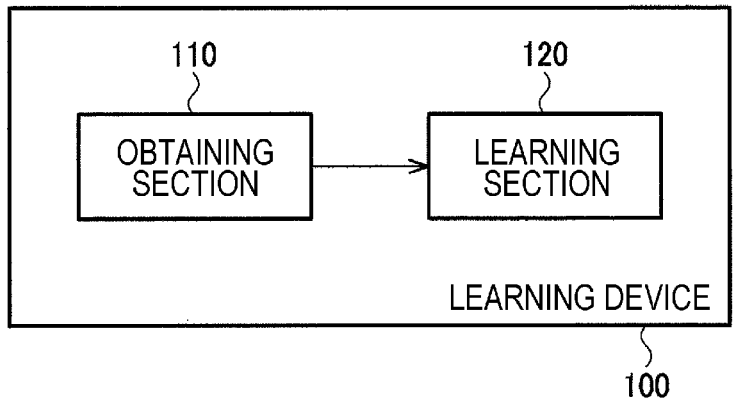
FIG. 5 is a diagram illustrating an example of a configuration of a learning device.

FIG. 5 is a diagram illustrating an example of a configuration of the learning device 100 according to this embodiment. The learning device 100 includes an obtaining section 110 obtaining training data to be used for learning and a learning section 120 performing machine learning based on the training data.

The obtaining section 110 is a communication interface which obtains training data from another device, for example. Alternatively, the obtaining section 110 may obtain training data stored in the learning device 100. The learning device 100 includes a storage section, not illustrated, and the obtaining section 110 is an interface which reads training data from the storage section. The learning in this embodiment is supervised learning, for example. Training data in the supervised learning is a data set in which input data and a correct label are associated with each other. The correct label may be rephrased as supervised data.

The learning section 120 performs machine learning based on the training data obtained by the obtaining section 110 so as to generate a learnt model. Note that the learning section 120 of this embodiment is configured by hardware described below. The hardware may include at least one of a circuit which processes digital signals and a circuit which processes analog signals. For example, the hardware may be configured by at least one circuit device implemented on a circuit substrate or at least one circuit element. At least one circuit device is an IC, for example. At least one circuit element is a resistance or a capacitor, for example.

Furthermore, the learning section 120 may be realized by a processor described below. The learning device 100 of this embodiment includes a memory storing information and the processor operating based on information stored in the memory. Examples of the information include programs and various data. The processor includes hardware. Various processors may be used including a CPU, a graphics processing unit (GPU), and a digital signal processor (DSP). The memory may be a semiconductor memory, such as a static random access memory (SRAM) or a dynamic random access memory (DRAM), a register, a magnetic storage device, such as a hard disk device, or an optical storage device, such as an optical disc device. For example, the memory stores computer readable instructions, and when the instructions are executed by the processor, functions of the sections included in the learning device 100 are realized as processes. Examples of the instructions include an instruction set constituting a program and an instruction for specifying an operation to be performed by a hardware circuit included in the processor.

The learning device 100 illustrated in FIG. 5 is included in the main server 30 as illustrated in FIG. 4, for example. Specifically, the main server 30 performs a process of obtaining a voucher image from the communication device 20 and machine learning based on the voucher image. Note that the learning device 100 may be included in an apparatus other than the main server 30. For example, the learning device 100 is included in an apparatus connected to the storage server 40 through the network NW. The apparatus obtains a voucher image stored in the storage server 40 through the network NW and performs machine learning based on the voucher image. Furthermore, various modifications of the concrete configuration of the learning device 100 may be made.

Specifically, the obtaining section 110 obtains sectional images obtained by dividing the voucher image and type information indicating types of character strings included in the sectional images. The learning section 120 mechanically learns the relationships between the sectional images and types based on data sets in which the sectional images and the type information are associated with each other. Use of the result of the machine learning enables accurate determination of types of the sectional images. For example, a type of character string which is important for an accounting process may be automatically and accurately extracted from a voucher, and therefore, the user may perform an appropriate accounting process.

2.2.2 Neural Network

Figure 6:
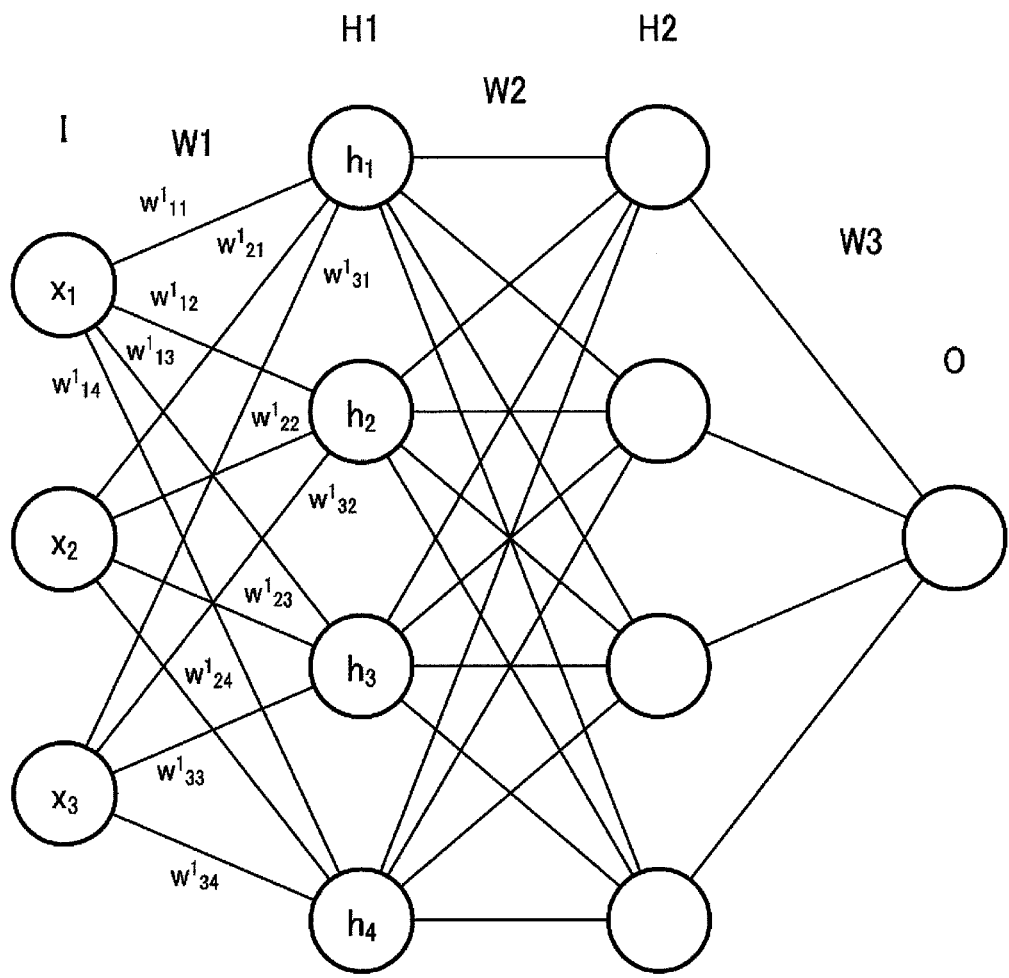
FIG. 6 is a diagram illustrating an example of a configuration of a neural network.

Machine learning using a neural network will be described as a concrete example of the machine learning. FIG. 6 is a diagram illustrating an example of a basic configuration of a neural network. The neural network is a mathematical model simulating a brain function using a computer. Each circle in FIG. 6 is referred to as a node or a neuron. In the example of FIG. 6, the neural network includes an input layer, two intermediate layers, and an output layer. The input layer is denoted by I, the intermediate layers are denoted by H1 and H2, and the output layer is denoted by O. Furthermore, in the example of FIG. 6, the number of neurons included in the input layer is 3, the number of neurons included in each of the intermediate layers is 4, and the number of neurons included in the output layer is 1. Note that the number of intermediate layers and the number of neurons included in each of the layers may be variously modified. Each of the neurons included in the input layer is coupled to the neurons included in the first intermediate layer H1. Each of the neurons included in the first intermediate layer is coupled to the neurons included in the second intermediate layer H2, and each of the neurons included in the second intermediate layer is coupled to the neuron included in the output layer. Note that the intermediate layers may be rephrased as hidden layers.

The neurons included in the input layer output respective input values. In the example of FIG. 6, the neural network receives x1, x2, and x3 as inputs, and the neurons included in the input layer output x1, x2, and x3, respectively. Note that preprocessing may be performed on the input values, and the neurons included in the input layer may output values obtained after the preprocessing.

In each of the neurons included in the intermediate layers onwards, a calculation simulating a state in which information is transmitted as an electric signal in a brain is performed. In a brain, a degree of easiness of transmission of information is changed depending on a coupling degree of synapses, and therefore, the coupling degree is represented by a weight W in the neural network. In FIG. 6, W1 indicates a weight between the input layer and the first intermediate layer. W1 indicates aggregate of weights of a given neuron included in the input layer and a given neuron included in the first intermediate layer. When a weight between a p-th neuron in the input layer and a q-th neuron in the first intermediate layer is denoted by "$w^1_{pq}$", the weight W1 of FIG. 6 is information including 12 weights $w^1_{11}$ to $w^1_{34}$. The weight W1 means information including a number of weights corresponding to a product of the number of neurons included in the input layer and the number of neurons included in the first intermediate layer in the broad sense.

In the first intermediate layer, a calculation based on Expression (1) is performed in a first neuron. In one neuron, outputs of neurons in a preceding layer connected to the neuron are subjected to a product-sum operation and a bias is further added to a resultant value. The bias is $b_1$ in Expression (1).

$$h_1 = f\left(\sum_i w_{i1}^1 \cdot x_i + b_1\right) \quad (1)$$

Furthermore, as illustrated in Expression (1), in a calculation in one neuron, an activating function f which is a non-linear function is used. An ReLU function indicated by Expression (2) below is used as the activating function f, for example. In the ReLU function, when a variable is 0 or less, 0 is selected and when a variable is larger than 0, a value of the variable itself is selected. However, various functions may be generally used as the activating function f, and a sigmoid function or a function obtained by modifying the ReLU function may be used. Although a calculation formula about h1 is illustrated in Expression (1), the similar calculation is performed on the other neurons included in the first intermediate layer.

$$f(x) = \max(0, x) = \begin{cases} 0 (x \le 0) \\ x (x \ge 0) \end{cases} \quad (2)$$

The same is true to the layer onwards. Assuming that a weight between the first and second intermediate layers is denoted by "$W^2$", in each of the neurons included in the second intermediate layer, a product-sum operation is performed using outputs of the first intermediate layer and the weight W2, a bias is added, and an activating function is applied. In the neuron included in the output layer, outputs of the preceding layer are added by weighting and a bias is added. In the example of FIG. 6, the preceding layer of the output layer is the second intermediate layer. In the neural network, a result of the calculation in the output layer corresponds to an output of the neural network.

As is apparent from the description above, an appropriate weight and an appropriate bias are required to be set to obtain a desired output from inputs. Note that the weight may be referred to as a weighting coefficient hereinafter. Furthermore, a bias may be included in the weighting coefficient. In the learning, a data set in which a given input x and an appropriate output for the input are associated with each other is prepared. The appropriate output is supervised data. The learning process in the neural network may be considered as a process of obtaining a most probable weighting coefficient based on the data set. In the learning process in the neural network, various learning methods including backpropagation are widely used. Since the learning methods may be widely applied in this embodiment, detailed descriptions thereof are omitted.

Furthermore, a configuration of the neural network is not limited to that illustrated in FIG. 6. For example, in the learning process and the estimation process described below in this embodiment, a convolutional neural network (CNN) which is widely used, for example, may be used. The CNN includes a convolutional layer and a pooling layer. A convolutional calculation is performed in the convolutional layer. Here, the convolutional calculation is specifically a filter process. A process of reducing a horizontal and vertical size of data is performed in the pooling layer. In the CNN, when image data is input, for example, a process may be performed taking the relationship between a given pixel and pixels in the vicinity of the given pixel into consideration. In the CNN, features of a filter used in the convolutional calculation is learnt by the learning process using the backpropagation. Specifically, the weighting coefficient in the neural network includes the filter characteristics in the CNN.

Note that the example in which a learnt model uses a neural network is described hereinabove. However, the machine learning in this embodiment is not limited to the method using a neural network. For example, various general machine learning methods, such as a support vector machine (SVM), or further developed machine learning methods may be applied as the method of this embodiment, for example.

2.2.3 Flow of Learning Process

Figure 7:
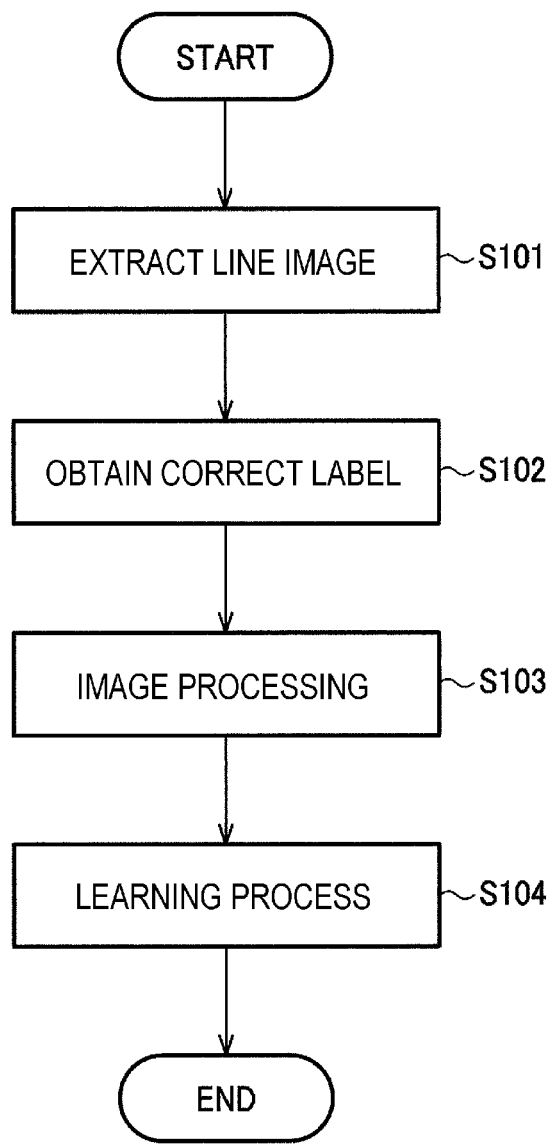
FIG. 7 is a flowchart of a process performed by the learning device.

FIG. 7 is a flowchart of a process performed by the learning device 100. When this process is started, first, the learning section 120 performs a process of extracting a line image from a voucher image obtained by the obtaining section 110 (S101). The line image is a sectional image obtained by dividing the voucher image in a unit of line.

Figure 8:
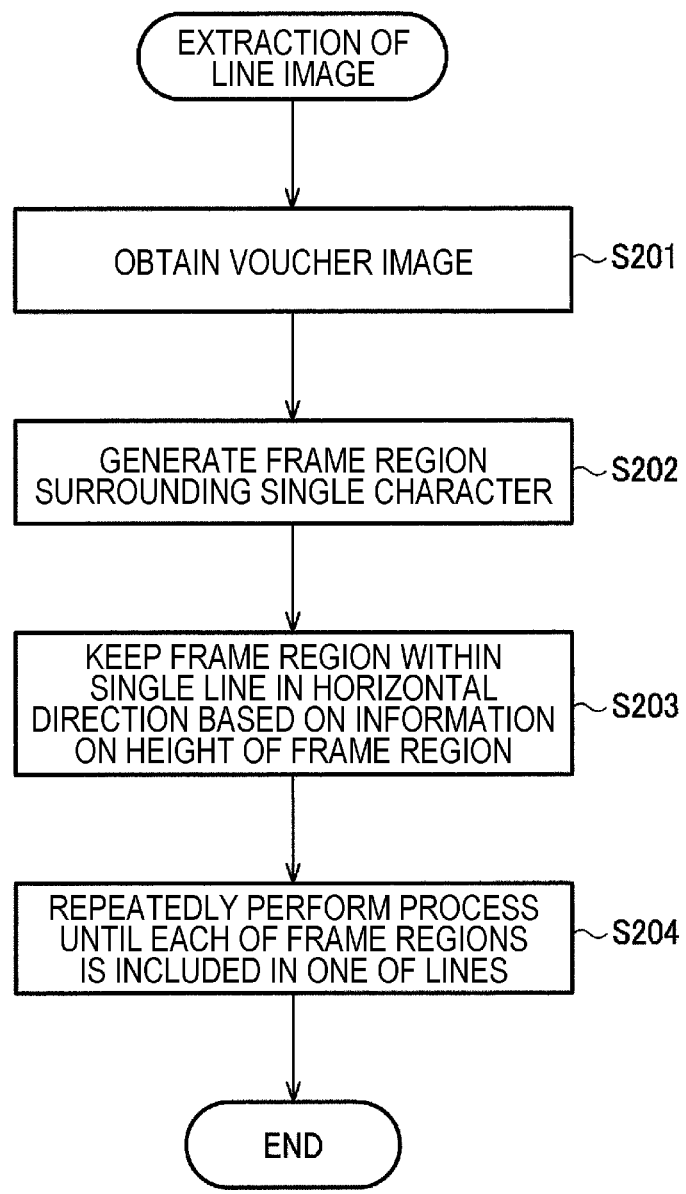
FIG. 8 is a flowchart of a process of extracting a line image.

FIG. 8 is a flowchart of the process of extracting a line image performed in step S101. First, the obtaining section 110 obtains a voucher image to be processed (S201). The learning section 120 performs the character recognition process in a unit of character using the OCR engine 300. Specifically, the learning section 120 serving as a processor, such as a CPU, activates the OCR engine 300 and causes the OCR engine 300 to execute the character recognition process on the voucher image. A frame region indicating a region recognized as a character and the character included in the frame region are specified by the character recognition process (S202). Subsequently, the learning section 120 performs a process of collecting a given frame region and other frame regions which are located in a horizontal direction relative to the given frame region as one line based on information on a height of the given frame region (S203). For example, when the given frame region and a range of another frame region overlap with each other in a vertical direction, the learning section 120 updates a range of one line such that the line includes both the two frame regions. The learning section 120 repeatedly performs this process until each of the frame regions is included in one of lines (S204). The learning section 120 determines a range of one line obtained in step S204 as a single line image.

Thereafter, the obtaining section 110 obtains correct labels corresponding to obtained line images (S102). The correct labels according to this embodiment are type information indicating types of sectional image. The types of sectional image indicated by the type information include a telephone number, an issuance date, and a total amount. In this way, information which is important for an accounting process may be appropriately detected in the voucher image.

Figure 9:
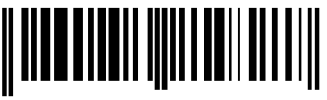
FIG. 9 is a diagram illustrating examples of line images and correct labels.

FIG. 9 is a diagram illustrating examples of the voucher image, the line images serving as the sectional images, and the correct labels assigned to the respective line images. In the example of FIG. 9, 19 line images D1 to D19 are extracted from the voucher image. The user manually assigns the correct labels to the individual line images. In this embodiment, a correct label indicating a telephone number is "0", a correct label indicating a date is "1", a correct label indicating a total amount is "2", and a correct label indicating others is "3". Note that the concrete examples of the correct labels may be variously modified.

In the example of FIG. 9, the user determines that a line indicated by D3 corresponds to a telephone number, and therefore, the correct label "0" is assigned to D3. Furthermore, the user determines that a line indicated by D6 corresponds to a date, and therefore, the correct label "1" is assigned to D6. The user determines that a line indicated by D9 corresponds to a total amount, and therefore, the correct label "2" is assigned to D9. Note that, in the example of FIG. 9, not only a telephone number of a store indicated by D3 but also a telephone number of "customer service" of a company is described as denoted by D18. The company of a transaction counterparty may be specified by this telephone number, and therefore, the user assigns the correct label "0" to D18. The correct label "3" indicating "others" is assigned to the other types since importance degrees of the other types are comparatively low in the accounting process.

Furthermore, the learning section 120 performs processing on the line images extracted from the voucher image (S103). Here, the processing includes a process of conversion to grayscale, a process of resize to a predetermined size, and a normalizing process of keeping a pixel value within a predetermined range. The predetermined size is 640×32 pixels, for example, and the range of a pixel value is from 0.0 to 1.0. However, the present disclosure is not limited to these. When the processing is performed, sizes of the line images and ranges of pixel values may be standardized, and therefore, the learning process to be performed thereafter may be facilitated.

By performing the process above, data sets in which the sectional images and the type information are associated with each other are obtained. The type information is specifically the correct labels. Note that the examples of the line images and the examples of the correct labels in the single voucher image are illustrated in FIG. 9. However, when accuracy of the learning process is to be improved, increase in the number of training data is effective. Accordingly, the learning device 100 preferably obtains a large number of data sets by performing the process from step S101 to step S103 on a large number of voucher images.

Figure 10:
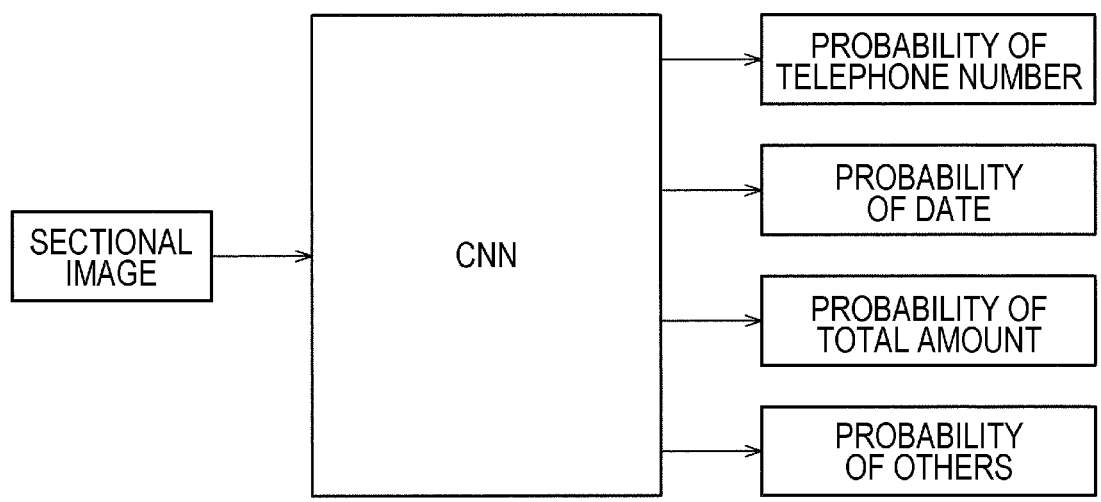
FIG. 10 is a diagram illustrating examples of an input and outputs of a neural network.

The learning section 120 performs the learning process using the obtained data sets as training data (S104). FIG. 10 is a diagram illustrating a model to be subjected to the learning process. Note that, although a neural network or a CNN is used in the narrow sense in the example of FIG. 10, other models may be used as described above. The CNN is a model for performing a categorization process, for example, receives a sectional image as an input, and outputs information indicating types of sectional image. The CNN illustrated in FIG. 10 outputs four types of information, that is, information indicating that a type of sectional image is a telephone number, information indicating that the type is a date, information indicating that the type is a total amount, and information indicating that the type is the others. When an output layer of the CNN is a softmax layer which is widely used, each of the outputs is indicated by a numerical value from 0 to 1 indicating the probability in which a character string included in the sectional image which is the input is the corresponding one of the types.

In the learning process, the learning section 120 performs a calculation in a forward direction using the sectional image as the input. Then the learning section 120 obtains an error function based on a result of the calculation in the forward direction and information on the type which is supervised data and updates weighting coefficient information using backpropagation or the like. When the type information indicates a telephone number, for example, supervised data of the output indicating the probability in which the type is a telephone number is 1, and supervised data of the output indicating the probability in which the type is a date, a total amount, and the others is 0. The learning section 120 obtains an error function indicating a degree of difference between probability data obtained by the calculation in the forward direction and the supervised data. As the error function, various functions of different formats are generally used, and these functions may be widely applied in this embodiment. The learning section 120 updates the weighting coefficient information using the backpropagation based on the obtained error function. The learning section 120 sets the weighting coefficient information by repeatedly performing the series of processes described above. For example, the learning section 120 determines some of the data sets obtained in the process from step S101 to step S103 as the training data and the remaining data sets as test data. The test data may be rephrased as evaluation data or validation data. Thereafter, the learning section 120 applies the test data to a learnt model generated using the training data so as to perform learning until an accuracy rate becomes equal to or larger than a predetermined threshold value.

FIG. 11 is a diagram illustrating examples of line images to which the type information indicating a telephone number, that is, the correct label "0", is assigned. Characters "TEL" may be included in lines indicating a telephone number as denoted by E1 and E4 of FIG. 11, or characters "telephone number" may be included as denoted by E2. Alternatively, neither the characters "TEL" nor the characters "telephone number" may be included as denoted by E3. Furthermore, a character string other than a telephone number, such as a store mane, may be included in the line including a telephone number as denoted by E3 and E4. As described above, the line images indicating a telephone number have different formats depending on a voucher image of an extraction source. In addition, a character font, a state of blur, color density, and the like may vary depending on a voucher image.

FIG. 12 is a diagram illustrating examples of line images to which the type information indicating a date, that is, the correct label "1", is assigned, for example. As illustrated in FIG. 12, lines indicating a date may include slashes or may include hyphens between numbers indicating month, day, and year. Furthermore, the dates may be described in various formats including a format of an hour and a minute, a format which additionally includes or does not include a character string indicating a second, and a format which includes or does not include a character string indicating a date and time. Furthermore, as with the telephone number, a character font, a state of blur, color density, and the like may vary.

FIG. 13 is a diagram illustrating examples of line images to which the type information indicating a total amount, that is, the correct label "2", is assigned, for example. A currency unit is described in the lines indicating a total amount as illustrated in FIG. 13, the currency unit may be represented by "Y" or "yen". Furthermore, only a character string "total" may be described or a character string "total amount" may be described. Moreover, the number of products may be included in a line of a total amount. As described above, also in the lines of a total amount, a character font, a state of blur, color density, and the like may vary depending on a voucher image.

In the general methods, it is difficult to accurately determine a position of a character string of a specific type due to such variation of patterns. However, since voucher images having various patterns are actually learnt as illustrated in FIGS. 11 to 13 in this embodiment, a character string of a desired type may be appropriately detected.

As described above, the learning section 120 generates a learnt model by the machine learning. The learnt model is used to perform a process of determining a type of sectional image obtained by dividing a voucher image. The information on a weighting coefficient is set in the learnt model having an input layer, an intermediate layer, and an output layer, based on a data set in which a sectional image and type information indicating a type of the sectional image are associated with each other. The information on a weighting coefficient includes a first weighting coefficient between the input layer and the intermediate layer and a second weighting coefficient between the intermediate layer and the output layer. The information on a weighting coefficient may include a weighting coefficient between a given intermediate layer and a succeeding intermediate layer. Each of the weighting coefficients include filter characteristics used in a convolution operation as described above. The learnt model causes the computer to function such that data on a sectional image received as an input is input to the input layer, a calculation is performed based on the set weighting coefficient information, and data indicating a type of the sectional image is output from the output layer. The learnt model is stored in a storage section 230 of the information processing device 200 as described below. Furthermore, the method of this embodiment may be applied to the learnt model.

2.3 Estimation Process 2.3.1 Configuration of Image Processing Apparatus

Figure 14:
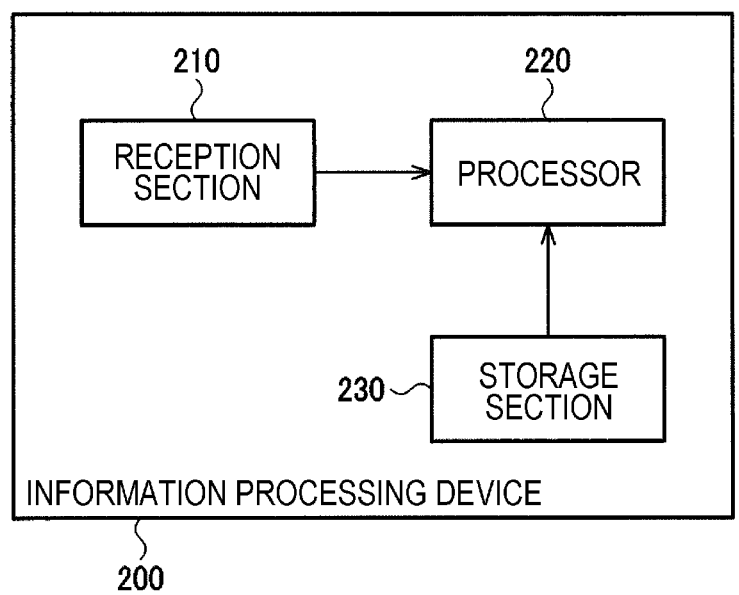
FIG. 14 is a diagram illustrating an example of a configuration of an information processing device.

FIG. 14 is a diagram illustrating an example of a configuration of an estimation device according to this embodiment. The information processing device 200 serves as the estimation device. The information processing device 200 includes a reception section 210, a processor 220, and a storage section 230.

The storage section 230 stores a learnt model obtained by mechanically learning the relationship between sectional images and types based on data sets in which the sectional information obtained by dividing a voucher image and the type information indicating types of character strings included in the sectional images are associated with each other. The reception section 210 receives an input of a voucher image to be subjected to the recognition process. The processor 220 generates sectional images by dividing the voucher image received as the input and performs the estimation process of determining types of the generated sectional images based on the learnt model.

In this way, the types of sectional image may be estimated based on the learnt model. As described above, the process using the learnt model may be accurately executed by performing the machine learning using various patterns of training data. Specifically, a situation in which a character string which is not a type of telephone number is falsely recognized as a telephone number, for example, may be avoided.

Note that the learnt model is used as a program module which is a portion of artificial intelligence software. The processor 220 outputs data indicating a type of sectional image which is an input in accordance with an instruction issued by the learnt model stored in the storage section 230.

As with the learning section 120 of the learning device 100, the processor 220 of the information processing device 200 is configured by hardware which includes at least one of a circuit which processes digital signals and a circuit which processes analog signals. Furthermore, the processor 220 may be realized by a processor below. The information processing device 200 of this embodiment includes a memory which stores information and a processor which operates based on information stored in the memory. Various processors may be used, such as a CPU, a GPU, or a DSP, as the processor. The memory may be a semiconductor memory, a register, a magnetic storage device, or an optical storage device.

Note that the calculation performed by the processor 220 based on the learnt model, that is, the calculation for outputting output data based on input data may be executed by software or hardware. That is, a product-sum calculation in Expression (1) and the like above or the filter calculation in the CNN may be executed by software. Alternatively, the calculations may be executed by a circuit device, such as a field-programmable gate array (FPGA). Furthermore, the calculations may be executed by a combination of software and hardware. Accordingly, the operation of the processor 220 in accordance with an instruction issued by the learnt model stored in the storage section 230 may be realized in various modes.

The information processing device 200 illustrated in FIG. 14 is included in the main server 30 as illustrated in FIG. 4, for example. Specifically, the main server 30 performs the process of obtaining a voucher image to be recognized from the communication device 20 and the process of determining a type of a sectional image based on the voucher image and the learnt model. Although detailed description is made hereinafter, the information processing device 200 may perform, in addition to the process specifying a type, a process of specifying and outputting a telephone number, a date, and a total amount.

2.3.2 Flow of Estimation Process

Figure 15:
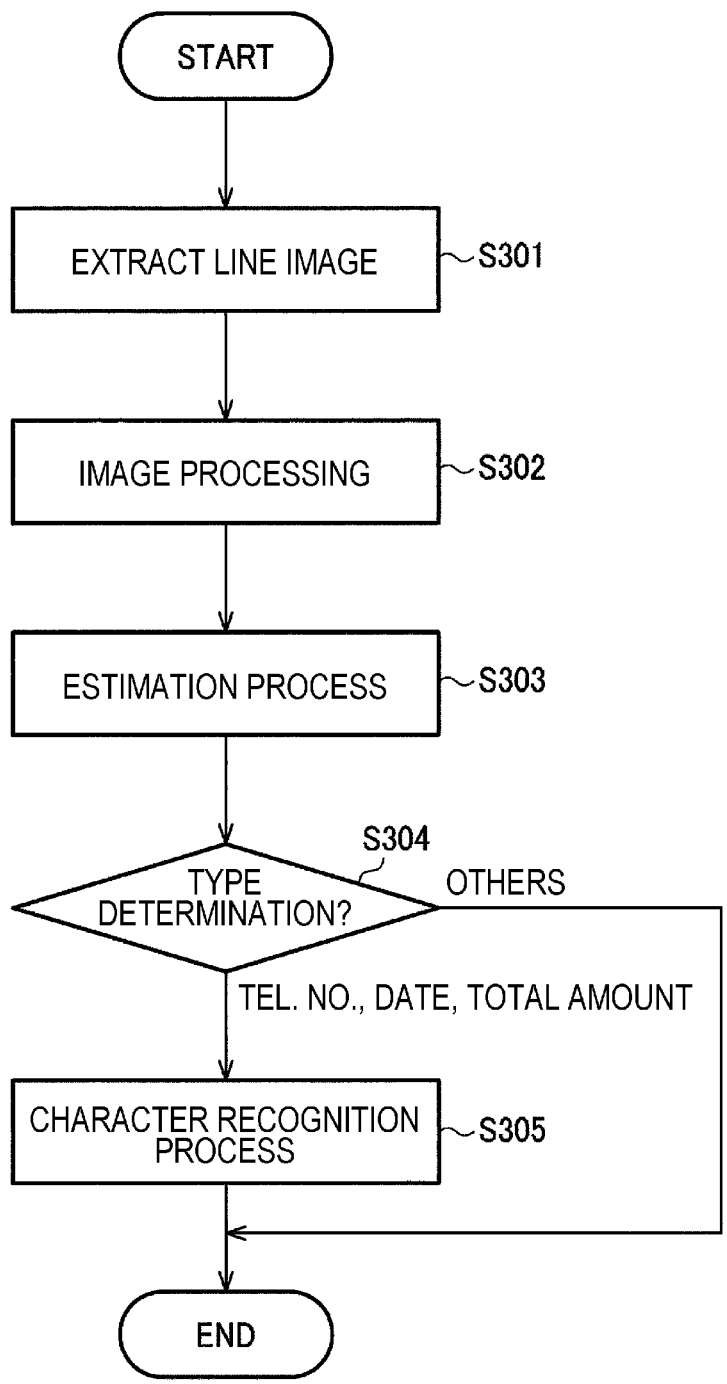
FIG. 15 is a flowchart of a process performed by the information processing device.

FIG. 15 is a flowchart of a process performed by the information processing device 200. When this process is started, first, the processor 220 divides the voucher image obtained by the reception section 210 in a unit of line so as to generate sectional images (S301). Specifically, the generation of sectional images described herein corresponds to the process of extracting line images. Since the process is performed for each line, widths of the sectional images are standardized in a width of the voucher image, and therefore, the generation of sectional images may be easily performed when compared with the second embodiment described below. Note that the process in step S301 is the same as the process described with reference to FIG. 8.

Subsequently, the processor 220 performs processing on the extracted line images (S302). As with the process in step S103 of FIG. 7, the processing includes a process of conversion to grayscale, a process of resize to a certain size, and a standardizing process of keeping a pixel value within a predetermined range.

The processor 220 performs the estimation process based on the sectional images corresponding to the line images obtained after the processing and the learnt model stored in the storage section 230 (S303). In the estimation process, a type of sectional image which is an input is determined. As illustrated in FIG. 10, the learnt model is a CNN which receives a sectional image as an input, for example, and which outputs probability indicating whether a type of the sectional image is a telephone number, a date, a total amount, or the others. Accordingly, the processor 220 determines that the input sectional image is a line image including a telephone number when the probability in which the type is a telephone number is equal to or larger than a given threshold value. Although various threshold values may be set in this embodiment, the threshold value is a value close to 1, such as 0.90. The same is true to the types other than a telephone number, and the processor 220 determines that a type of the input sectional image is a given type when the probability of the given type is equal to or larger than the threshold value.

By performing the process described above, lines corresponding to a telephone number, lines corresponding to a date, and lines corresponding to a total amount are specified in the voucher image received by the reception section 210. Not only positions of telephone numbers and so on are specified in a voucher but also the telephone numbers, dates, and total amounts are preferably output in detail in terms of usability. Therefore, the processor 220 performs a character recognition process on the sectional images determined to correspond to the given type (S304 and S305). The given type specifically corresponds to a telephone number, a date, and a total amount. By this, information on an appropriate type, such as a telephone number, may be displayed for the user.

Note that line images are extracted by performing the character recognition process in a unit of character using the OCR engine 300 as described with reference to FIGS. 7 and 8. Therefore, characters in a frame region is specified in detail in the process of step S301 of FIG. 15. The character recognition process in step S305 may be a process of obtaining a result of the character recognition process performed using the OCR engine 300.

However, the processor 220 may perform a character recognition process which is different from the character recognition process using the OCR engine 300 in the process of step S305. For example, the storage section 230 stores a second learnt model obtained by mechanically learning the probability of characters included in a character image based on a second data set in which the character image and a character included in the character image are associated with each other. The second learnt model has learnt numbers 0 to 9 based on a large number of images for learning. Accordingly, the second learnt model may estimate one of the numbers 0 to 9 corresponding to an input image with higher accuracy when compared with the OCR engine 300. Furthermore, depending on content of the character recognition process, the second learnt model may be obtained by learning limited types of characters including a slash and specific symbols, such as "Y" representing Japanese yen. In this case, the second learnt model may estimate the limited types of character with higher accuracy when compared with the OCR engine 300. Furthermore, the processor 220 may perform the character recognition process using the second learnt model on all the line images, but the present disclosure is not limited to this. The processor 220 may perform the character recognition process using the second learnt model on a region determined as a character which has been learnt by the second learnt model, such as "0" to "9", based on a result of the character recognition process using the OCR engine 300.

The processor 220 performs the character recognition process by determining a degree of certainty of a character included in a sectional image based on the sectional image determined as a given type and the second learnt model. In this way, since the second learnt model which is specialized in recognition of a telephone number, a date, and a total amount is used, the telephone number and so one may be recognized with high accuracy.

The process in step S305 will be described in detail. In a voucher image, a plurality of types of information may be rarely mixed in one line. Therefore, the processor 220 identifies a telephone number and so on by extracting number portions from a result of the character recognition process performed on a line image. However, as illustrated in FIG. 12, a date includes information on time in many cases in addition to information on a date. Therefore, when numbers are simply extracted from a line image corresponding to a date, various false recognition may occur such that information on time is determined as information on a date. Therefore, the processor 220 performs the character recognition process of extracting numbers for a telephone number and a total amount and performs the character recognition process taking a format into consideration for a date. A format of a date is "month/day/year", for example.

Alternatively, as denoted by E4 of FIG. 11, numbers other than a telephone number may be included in a line of a telephone number. Similarly, numbers other than a total amount may be included in a line of a total amount. Therefore, the processor 220 may perform the character recognition process using a give format for a telephone number and a total amount. A format of a telephone number is a combination of a plurality of numbers and hyphens, such as "XXXX-XX-XXXX", or the like. A format of a total amount is "total XXXX yen", "total YXXXX", or the like. Note that the processor 220 outputs "unknown" when a character string does not match any type of format. When "unknown" is output, the processor 220 performs a notification process of prompting the user to manually perform the character recognition.

As described above, the processor 220 performs a first character recognition process on a sectional image determined as a first type and performs a second character recognition process which is different from the first character recognition process on a sectional image determined as a second type which is different from the first type. The first and second character recognition processes may be different from each other in a use or non-use of a format or in a format to be used as described above. Furthermore, the difference is not limited to the difference in a format, and the processor 220 may use various character recognition processes depending on a type.

Note that, in any of the situation in which the OCR engine 300 is used and the situation in which the second learnt model is used, it is determined that "unknown" is to be output depending on accuracy of the character recognition process. However, since a line corresponding to a specific type may be estimated with high accuracy according to the method of this embodiment, the false recognition illustrated in FIGS. 1 to 3 may be avoided.

Figure 16:
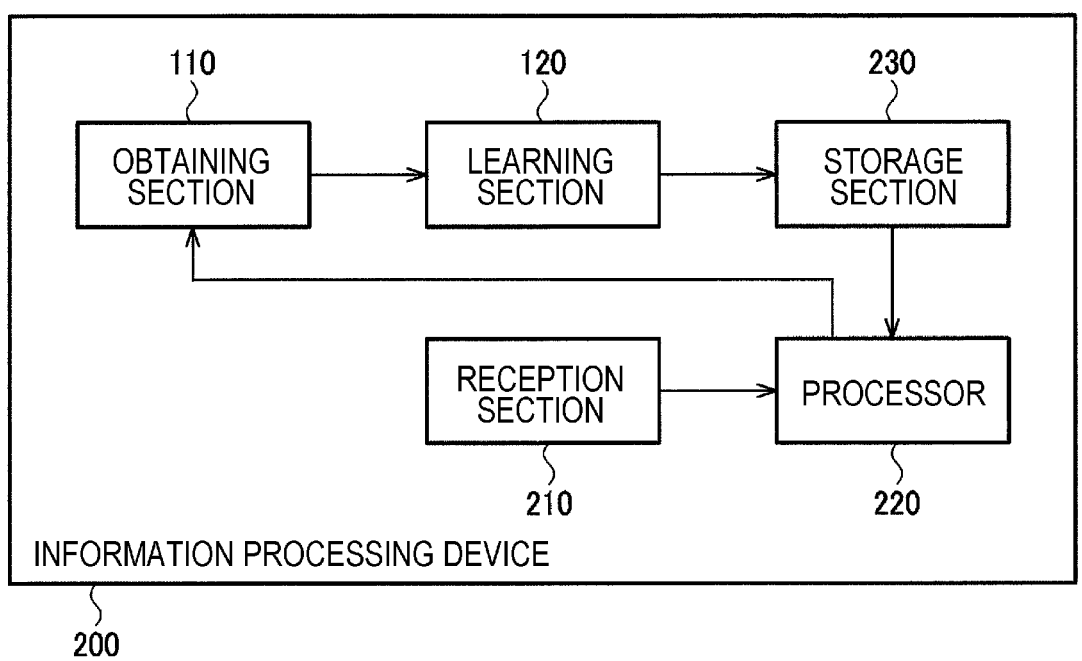
FIG. 16 is a diagram illustrating an example of another configuration of the information processing device.

Although the learning device 100 and the information processing device 200 are separately described in the foregoing description, they may be integrated as a single device. FIG. 16 is a diagram illustrating an example of another configuration of the information processing device 200. The information processing device 200 of FIG. 16 includes an obtaining section 110 which obtains a sectional image and type information and a learning section 120 which mechanically learns the relationship between the sectional image and a type of a character included in the sectional image based on a data set in which the sectional image and the type information are associated with each other in addition to the configuration illustrated in FIG. 14. Specifically, the information processing device 200 of FIG. 16 includes a configuration the same as that of the learning device 100 illustrated in FIG. 5, and may execute both the learning process and the estimation process.

3. Second Embodiment

The second embodiment will now be described. Note that an estimated system 1 is the same as that described with reference to FIG. 4, and therefore, a detailed description thereof is omitted. Furthermore, portions which are the same as those of the first embodiment are appropriately omitted.

3.1 Learning Process

A sectional image according to the second embodiment is a region image including a given type of character string. FIG. 17 is a diagram illustrating examples of region images including character strings indicating telephone numbers. The region image indicates a region of a character string in has a format "XXXX-XX-XXXX" or the like or a region including the character string and characters, such as "TEL" or "telephone". As is apparent from comparison between FIGS. 17 and 11, the region image does not include types of character string other than a telephone number. When another character string, such as a store name, is included in the same line, the other character string is also included in a line image of a telephone number according to the first embodiment, for example. However, the store name or the like is excepted from the region image according to the second embodiment. Furthermore, unrequired blanks may be removed from the region image.

FIG. 18 is a diagram illustrating examples of region images including character strings indicating dates. The region image includes a character string in a format "month/day/year" or the like. As is apparent from comparison between FIGS. 18 and 12, the region image does not include information on a time.

FIG. 19 is a diagram illustrating examples of region images including character strings indicating total amounts. The region image includes a character string in a format "total XXXX yen" or a format "total YXXXX" or the like. When FIGS. 19 and 13 are compared with each other, a large difference is not seen except for positions of blanks. However, when some sort of character string is included in a portion before "total" or a portion after "XXXX yen" in the lines of a total amount, a line image includes the character string but a region image does not include the character string.

As illustrated in FIGS. 17 to 19, according to the second embodiment, unrequired information may be excepted from the sectional image using a region image as the sectional image according to the second embodiment when compared with the example in which a line image is used.

According to the second embodiment, as with the first embodiment, for example, the model illustrated in FIG. 10 is used. The user extracts a region image of a telephone number, a region image of a date, and a region image of a total amount based on a voucher image and assigns correct labels "0", "1", and "2", respectively, as type information. Then the learning section 120 performs the learning process using the region image as an input and using the type information as supervised data so as to set weighting coefficient information. Note that information set by the user is not limited to a region image itself and the region image may be replaced by information indicating a position of the region image in the voucher image. The region image has a rectangular shape, and information indicating a position of the region image indicates a coordinate value of a vertex and lengths in vertical and horizontal directions or coordinate values of two vertices which are diagonally positioned.

Note that a process of setting a window indicating a candidate of a region image may be incorporated in the neural network as described below in the estimation process. Specifically, the learnt model according to the second embodiment may include at least a component which categorizes the sectional images according to the types of sectional image as illustrated in FIG. 10, and a model including another process may be used.

3.2 Estimation Process

FIG. 20 is a flowchart of a process performed by the information processing device 200. When this process is started, first, the processor 220 extracts an image of a portion of a voucher image obtained by the reception section 210 as a sectional image (S401). Specifically, the processor 220 sets a retrieval window of a given size in a given position of the voucher image and determines a region surrounded by the retrieval window as a sectional image. The retrieval window specifically has a rectangular shape. The processor 220 performs a process of categorizing a type of the sectional image based on the sectional image obtained in step S401 and the learnt model stored in the storage section 230 (S402).

The processor 220 sets a plurality of retrieval windows of different sizes in different positions in the voucher image and generates sectional images by dividing regions in the voucher image corresponding to the set retrieval windows. For example, the processor 220 generates a plurality of sectional images from a single voucher image by moving the retrieval window of a first size in a unit of pixel. Then the processor 220 inputs the individual sectional images to the CNN illustrated in FIG. 10 so as to perform categorization according to types of the sectional images. Note that sizes of the region images of a telephone number and the like are not fixed as illustrated in FIGS. 17 to 19. Therefore, the processor 220 generates a plurality of sectional images by moving a retrieval window of a second size which is different from the first size in a unit of pixel after the process performed by the retrieval window of the first size and performs the categorization process on the individual sectional images. The number of sizes of the retrieval window is not limited to 2, and various sizes estimated as the region image of a telephone number or the like may be employed.

Note that, in this method, the number of sectional images is increased and the method using the CNN is required to be performed on all the sectional images, and therefore, a processing load is large. On the other hand, machine learning for specifying a position and a category of a predetermined object in an image has been widely used. For example, as a machine learning method for performing object recognition, a single shot multibox detector (SSD), you only look once (Yolo), and Faster-regional CNN (RCNN) are generally used. In these methods, a deep learning method is also applied to a process of determining a region of interest (RoI) of categorization in an input image, that is, a process of setting a retrieval window. Therefore, a processing load is smaller when compared with a method for gradually shifting a retrieval window by a predetermined distance. In this case, the processor 220 may input the entire voucher image received by the reception section 210 into the learnt model using the SSD or the like without performing preprocessing, such as a retrieval window setting. The learning process and the estimation process according to this embodiment may be performed by these methods. Each of the methods is widely used, and therefore, a detailed description thereof is omitted. Furthermore, methods obtained by developing these methods may be employed.

As described above, in the processes in step S401 and step S402 of FIG. 20, only the process in step S402 may be executed using the machine learning method or both of the processes in step S401 and step S402 may be executed using the machine learning method. In any of the methods, the learnt model repeatedly performs a setting of sectional images and a categorization process until a given end condition is satisfied (Yes in S403). Examples of the end condition include a condition in which a region having a degree of probability of one the types including a telephone number, a date, and a total amount which is equal to or larger than a predetermined threshold value is detected and a condition in which a process is performed on a predetermined number of sectional images. When the end condition is satisfied, the processor 220 outputs positions and types of the sectional images. For example, the processor 220 outputs information indicating that a region of a telephone number is in a coordinate of (x1, y1)-(x2, y2), a region of a date is in a coordinate of (x3, y3)-(x4, y4), and a region of a total amount is in a coordinate of (x5, y5)-(x6, y6).

When the regions are detected, the processor 220 performs the character recognition process on images of the regions (S404). The process in step S404 is the same as that in step S305 of FIG. 15. However, the region images have less unrequired regions when compared with the line images, and therefore, the processor 220 may perform the character recognition process, such as a process of outputting all characters included in the region images, without using a template, for example. Note that, when the machine learning is performed while regions including a character string "total", a character string "YXXXX", and the like are set as region images, for example, sectional images determined as a total amount region may include other information, such as the number of products. Therefore, various modifications may be made such that the character recognition process without a template is performed on the regions corresponding to a telephone number and a date and the character recognition process with a template "YXXXX" is performed on the regions corresponding to a total amount.

4. Modifications

The mechanical learning performed based on a data set in which a sectional image and type information are associated with each other is described hereinabove. However, the data set used for the learning process may include other information. For example, a telephone number and a date are positioned on an upper portion of a receipt in many cases. Therefore, the learning section 120 may perform the machine learning based on a data set including positional information in addition to a sectional image and type information. The positional information may be a coordinate value or schematic information indicating an upper portion, a middle portion, or a lower portion. Then the learning section 120 performs the learning process using the sectional image and the positional information as inputs and using type information as supervised data so as to set weighting coefficient information. The processor 220 of the information processing device 200 obtains positional information of a sectional image in a voucher image when generating the sectional image. Then the processor 220 inputs the sectional information and the positional information in the learnt model so as to determine a type. In this way, processing accuracy may be further improved by taking a position of the sectional image in the voucher image into consideration.

Furthermore, the example in which various voucher images are processed using a single learnt model is described above. However, when a type of voucher image may be discriminated, a learnt model specialized to the type may be used. A type of the voucher image indicates a store which has issued the voucher, for example. The learning section 120 performs a learning process of a learnt model for a first store and a learning process of a learnt model for a second store, for example. Thereafter, the processor 220 of the information processing device 200 determines a store which has issued a voucher image obtained by the reception section 210 and determines a type of a sectional image using a learnt model for the store. By this, processing corresponding to the type of voucher image of the store or the like may be performed, and therefore, processing accuracy may be further improved.

As described above, the information processing device according to this embodiment includes a storage section, a reception section, and a processor. The storage section stores a learnt model obtained by mechanically learning the relationship between a sectional image obtained by dividing a voucher image and a type of a character string included in the sectional image based on a data set in which the sectional image and type information indicating the type are associated with each other. The reception section receives an input of a voucher image to be subjected to a recognition process. The processor generates sectional images by dividing the voucher image received as the input and performs an estimation process of determining types of the generated sectional images based on the learnt model.

According to the method of this embodiment, a type of a sectional image obtained by dividing a voucher image to be processed is estimated using a learnt model obtained by mechanically learning performed based on a data set in which a sectional image and type information are associated with each other. By this, types of individual sectional images may be accurately determined. When a specific type of character string is extracted from a voucher image, regions corresponding to other types may be excepted for the character recognition process, and therefore, false recognition may be avoided.

Furthermore, the processor may generate sectional images by dividing a voucher image in a unit of line.

By this, generation of sectional images is easily performed and an excessively large number of sectional images are not generated from a single voucher image, and therefore, a processing load may be reduced.

The processor may set a plurality of retrieval windows in different positions or of different sizes in the voucher image and generate sectional images by dividing regions in the voucher image corresponding to the set retrieval windows.

By this, the sectional images may be flexibly set.

Furthermore, the processor may perform the character recognition process on a sectional image determined to be a given type.

Accordingly, a specific type of information may be appropriately obtained from the voucher image.

Furthermore, the processor may perform a first character recognition process on a sectional image determined as a first type and perform a second character recognition process which is different from the first character recognition process on a sectional image determined as a second type which is different from the first type.

Accordingly, by performing the character recognition process in accordance with a type of sectional image, recognition accuracy may be improved.

The storage section may store a second learnt model obtained by mechanically learning the probability of characters included in a character image based on a second data set in which the character image and the characters included in the character image are associated with each other. The processor performs the character recognition process by determining the probability of a character included in a sectional image based on the sectional image determined as a given type and the second learnt model.

Accordingly, the machine learning method may be employed in the character recognition process, and therefore, recognition information may be improved.

The types of sectional image indicated by the type information may include a telephone number, an issuance date, and a total amount.

In this way, information which is important for an accounting process may be appropriately obtained from the voucher image.

Furthermore, the information processing device may include an obtaining section which obtains a sectional image and type information and a learning section which mechanically learns the relationship between the sectional image and a type based on a data set in which the sectional image and the type information are associated with each other.

Accordingly, both the learning process and the estimation process may be performed in the information processing device.

Furthermore, a learnt model may include an input layer, an intermediate layer, and an output layer, and weighting coefficient information including a first weighting coefficient between the input layer and the intermediate layer and a second weighting coefficient between the intermediate layer and the output layer may be set in the learnt model based on a data set in which the sectional image and the type information are associated with each other. The learnt model causes a computer to function such that data of a sectional image received as an input is input to the input layer, a calculation based on the set weighting coefficient information is performed, and data indicating a type of the sectional image is output from the output layer.

By this, the machine learning using a neural network may be applied.

Furthermore, the learning device includes an obtaining section which obtains a sectional image obtained by dividing a voucher image and type information indicating a type of a character string included in the sectional image and a learning section which mechanically learns the relationship between the sectional image and the type based on a data set in which the sectional image and the type information are associated with each other.

In the method of this embodiment, machine learning is performed using a data set in which the sectional image and the type information are associated with each other. By performing the machine learning as described above, a result of learning capable of accurately determining types of individual sectional images may be obtained. For example, when a specific type of character string is to be extracted from a voucher image, a learning result which may avoid false recognition may be obtained.

The learnt model of this embodiment is used to perform a process of determining a type of sectional image obtained by dividing a voucher image. Furthermore, a learnt model includes an input layer, an intermediate layer, and an output layer, and weighting coefficient information including a first weighting coefficient between the input layer and the intermediate layer and a second weighting coefficient between the intermediate layer and the output layer is set in the learnt model based on a data set in which a sectional image and type information indicating a type of a character string included in the sectional image are associated with each other. The learnt model causes a computer to function such that data of a sectional image received as an input is input to the input layer, a calculation based on the set weighting coefficient information is performed, and data indicating a type of the sectional image is output from the output layer.

Although the embodiments are described in detail hereinabove, those who skilled in the art may easily understand that various modifications may be made without nounenally departing from novelty and effects of this embodiment. Accordingly, such modifications are all included in the scope of the present disclosure. For example, terms which are described at least once along with different terms which have wide meanings or which have the same meanings may be replaced by the corresponding different terms in any portion in the specification and the drawings. Furthermore, all combinations of the embodiments and the modifications are included in the scope of the present disclosure. Furthermore, configurations and operations of the learning device, the information processing device, and the system including the learning device and the information processing device are also not limited to those described in the embodiments, and various modifications may be made.

What is claimed is:

1. An information processing device comprising:
   a storage section configured to store a learnt model obtained by mechanically learning the relationship between a sectional image by dividing a voucher image by a plurality of horizontal lines extending across a width of the voucher image and a type of a character string included in the sectional image based on a data set in which the sectional image is associated with type information indicating the type;
   a reception section configured to receive an input of the voucher image to be subjected to a recognition process; and
   a processor configured to generate a plurality of sectional images by dividing the voucher image by a plurality of horizontal lines extending across a width of the voucher image and perform an estimation process of determining the type of each sectional image in the plurality of sectional images based on the learnt model.

2. The information processing device according to claim 1, wherein
   the processor generates the sectional image by dividing the voucher image in a unit of line.

3. The information processing device according to claim 1, wherein
   the processor
   sets a plurality of retrieval windows in different positions or of different sizes in the voucher image, and
   generates the sectional images by dividing the voucher image corresponding to the set retrieval windows.

4. The information processing device according to claim 1, wherein
   the processor performs a character recognition process on the sectional image determined as a given type.

5. The information processing device according to claim 4, wherein
   the processor
   performs a first character recognition process on the sectional image determined as a first type, and
   performs a second character recognition process which is different from the first character recognition process on the sectional image determined as a second type which is different from the first type.

6. The information processing device according to claim 4, wherein
   the storage section stores a second learnt model obtained by mechanically learning probability of a character included in a character image based on a second data set in which the character image is associated with the character included in the character image, and
   the processor performs the character recognition process by determining probability of the character included in the sectional image based on the sectional image determined as the given type and the second learnt model.

7. The information processing device according to claim 4, wherein
a type of the sectional image represented by the type information is a telephone number, an issuance date, or a total amount.

8. The information processing device according to claim 1, further comprising:
an obtaining section configured to obtain the sectional image and the type information; and
a learning section mechanically learning the relationship between the sectional image and the type based on the data set in which the sectional image is associated with the type information.

9. An information processing device according to claim 1, wherein
the learnt model includes an input layer, an intermediate layer, and an output layer,
weighting coefficient information including a first weighting coefficient between the input layer and the intermediate layer and a second weighting coefficient between the intermediate layer and the output layer is set based on the data set in which the sectional image is associated with the type information in the learnt model, and
the learnt model causes a computer to function such that data of the sectional image received as an input is input to the input layer, a calculation based on the set weighting coefficient information is performed, and data indicating the type of the sectional image is output from the output layer.

10. A learning section comprising:
an obtaining section configured to obtain a sectional image by dividing a voucher image by a plurality of horizontal lines extending across a width of the voucher image and obtain type information indicating a type of a character string included in the sectional image; and
a learning section configured to mechanically learn the relationship between each sectional image and the type based on a data set in which the corresponding sectional image is associated with the type information.

11. A non-transitory computer-readable storage medium storing a learnt model used to perform a process of determining a type of each of a plurality of sectional images by dividing a voucher image by a plurality of horizontal lines extending across a width of the voucher image, wherein
the learnt model includes an input layer, an intermediate layer, an output layer, and weighting coefficient information,
the weighting coefficient information, including a first weighting coefficient between the input layer and the intermediate layer and a second weighting coefficient between the intermediate layer and the output layer, is set based on a data set in which each sectional image is associated with type information indicating a type of a character string included in the corresponding sectional image in the learnt model, and
the learnt model causes a computer to function such that data of each sectional image received is input to the input layer, a calculation based on the set weighting coefficient information is performed, and data indicating the type of the corresponding sectional image is output from the output layer.

* * * * *